(12) United States Patent
Cohill

(10) Patent No.: US 6,491,335 B1
(45) Date of Patent: Dec. 10, 2002

(54) AUTOMOBILE BODY COVER

(76) Inventor: Jerry Cohill, 5421 Marine Ave., Lawndale, CA (US) 90260

( * ) Notice: Subject to any disclaimer, the term of this patent is extended or adjusted under 35 U.S.C. 154(b) by 0 days.

(21) Appl. No.: 10/081,804

(22) Filed: Feb. 22, 2002

(51) Int. Cl.[7] .............................................. B60J 11/00
(52) U.S. Cl. ...................................... 296/136; 150/166
(58) Field of Search ........................ 296/136; 280/770; 150/166

(56) References Cited

U.S. PATENT DOCUMENTS

| | | | | |
|---|---|---|---|---|
| 3,763,908 | A | * 10/1973 | Norman | 150/166 |
| 4,589,459 | A | * 5/1986 | Lantrip | 150/166 |
| 4,635,996 | A | * 1/1987 | Hirose | 296/136 |
| 4,938,522 | A | * 7/1990 | Herron et al. | 150/166 |
| 5,012,760 | A | * 5/1991 | George, Jr. | 296/136 |
| 5,112,098 | A | * 5/1992 | Lichtmann | 296/136 |
| 5,209,545 | A | * 5/1993 | Slaugh | 150/166 |
| 5,242,206 | A | * 9/1993 | Heck | 150/166 |
| 5,820,196 | A | * 10/1998 | Rudys et al. | 150/166 |
| 5,845,958 | A | * 12/1998 | Rudys et al. | 150/166 |
| 5,915,399 | A | * 6/1999 | Yang | 296/136 |
| 6,017,079 | A | * 1/2000 | Warner | 296/136 |
| 6,099,067 | A | * 8/2000 | Butterworth | 296/136 |
| 6,220,648 | B1 | * 4/2001 | Daniel | 296/136 |
| 6,273,493 | B1 | * 8/2001 | Woo | 150/166 |
| 6,340,198 | B1 | * 1/2002 | Benites et al. | 296/136 |
| 6,371,547 | B1 | * 4/2002 | Halbrook | 150/166 |

FOREIGN PATENT DOCUMENTS

EP        1061008 A1 * 12/2000

* cited by examiner

Primary Examiner—D. Glenn Dayoan
Assistant Examiner—Jason Morrow
(74) Attorney, Agent, or Firm—Goldstein & Lavas, P.C.

(57) ABSTRACT

An automobile body cover for positioning over an automobile body. The automobile body cover has a plurality of individual covers that together completely cover the automobile body. The body cover includes a front cover, a rear cover, a front middle cover, and a rear middle cover. Each cover fits over the corresponding part of the automobile. Each cover has an inner layer and an outer layer, an open bottom end, and a bottom edge. The layers are bound together at the bottom edge. When in place over the automobile, the inner layer rests against the automobile body. A plurality of C-shaped hooks extend downward from the bottom edges of the covers. These hooks secure the covers in place under the automobile. A plurality of magnets are positioned along the cover bottom edges, between the inner layer and the outer layer.

1 Claim, 3 Drawing Sheets

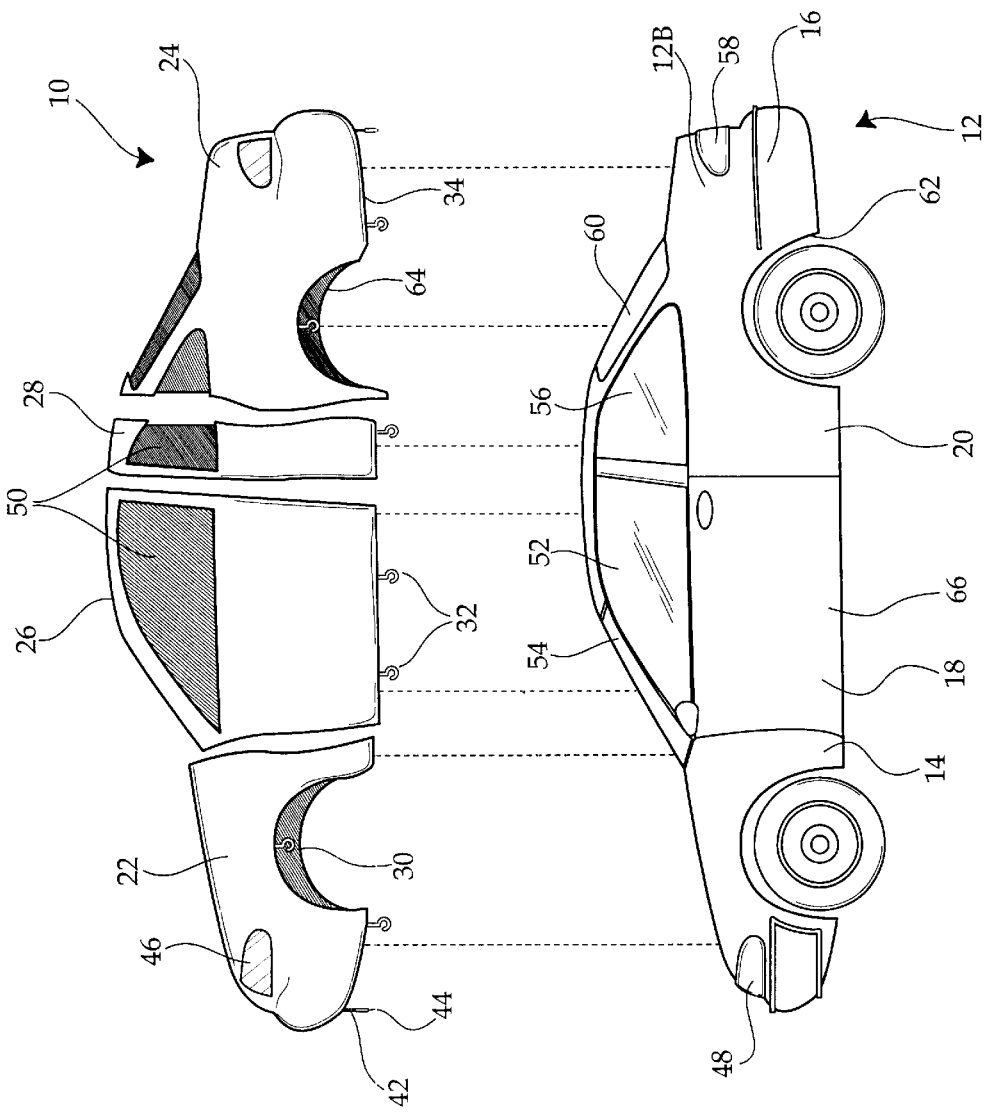

AUTOMOBILE BODY COVER

BACKGROUND OF THE INVENTION

The invention relates to an automobile body cover. In particular, the invention is a series of covers that are draped over corresponding sections of an automobile in order to protect the automobile body from damage caused by exposure to outside elements, namely the weather and collisions with other cars.

People use automobiles daily for transportation, and often own their own cars. Because of the expense of cars, an owner normally seeks to keep the automobile in the best possible condition. This is a difficult task since the car is exposed to various elements, namely rain, snow, and sun, as well as contact with other people and other cars.

Thus, there exists a need for a cover which may be placed over an automobile in order to protect the automobile body from damage. Such a cover should be capable of staying in place over the automobile while the car is being driven without interfering with the normal use of the car.

While the available units may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved automobile body cover. As such, the general purpose of the present invention, which will be described subsequently in greater detail, is to provide a new and improved automobile body cover which has all the advantages of the prior art and none of the disadvantages.

To attain this, the present invention essentially comprises an automobile body cover for positioning over an automobile body. The automobile body cover has a plurality of individual covers that together completely cover the automobile body. The body cover includes a front cover, a rear cover, a front middle cover, and a rear middle cover. Each cover fits over the corresponding part of the automobile. Each cover has an inner layer and an outer layer, an open bottom end, and a bottom edge. The layers are bound together at the bottom edge. When in place over the automobile, the inner layer rests against the automobile body. A plurality of C-shaped hooks extend downward from the bottom edges of the covers. These hooks secure the covers in place under the automobile. Also positioned along the cover bottom edges, between the inner layer and the outer layer, are a plurality of magnets.

It is an object of the invention to produce an automobile body cover which may be easily fit over an automobile and attached thereto with little effort. Accordingly, the cover is divided into separate covers that correspond the shade of different sections of the automobile. Each cover is draped over the corresponding automobile section and attached thereto with C-shaped hooks.

It is a further object of the invention to produce an automobile body cover which may be kept in place over the automobile while the car is in use. Accordingly, the cover is designed to conform the shape and contours of the automobile. Thus, the windows and doors may be utilized while the cover is in place with no interference from the cover.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a left side elevational view of the automobile body covers, separated into its individual sections, and positioned over the corresponding automobile part.

Figure 3:
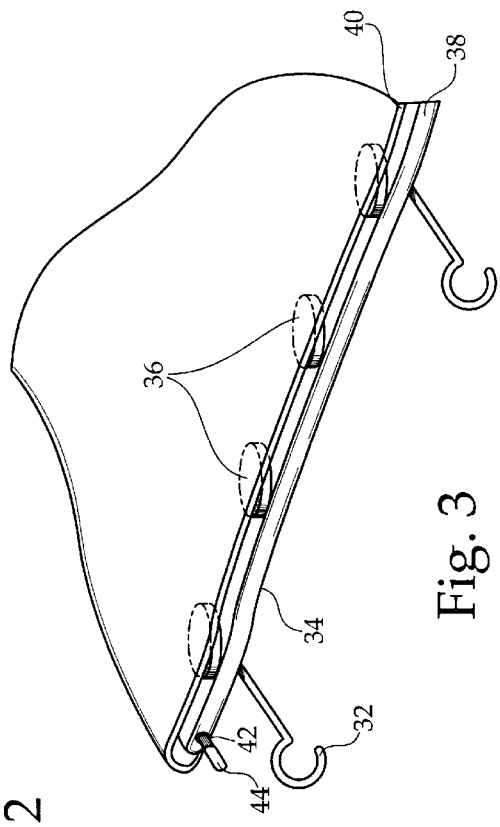
FIG. 3 is a perspective view of the bottom end of one section of the automobile body covers.
Figure 2:
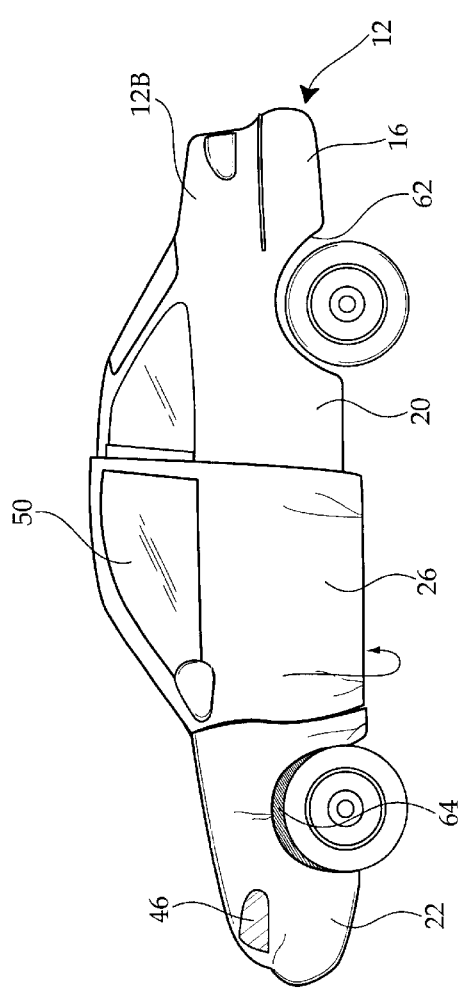
FIG. 2 is a left side elevational view of two sections of the automobile body covers placed over the corresponding automobile parts.
Figure 4:
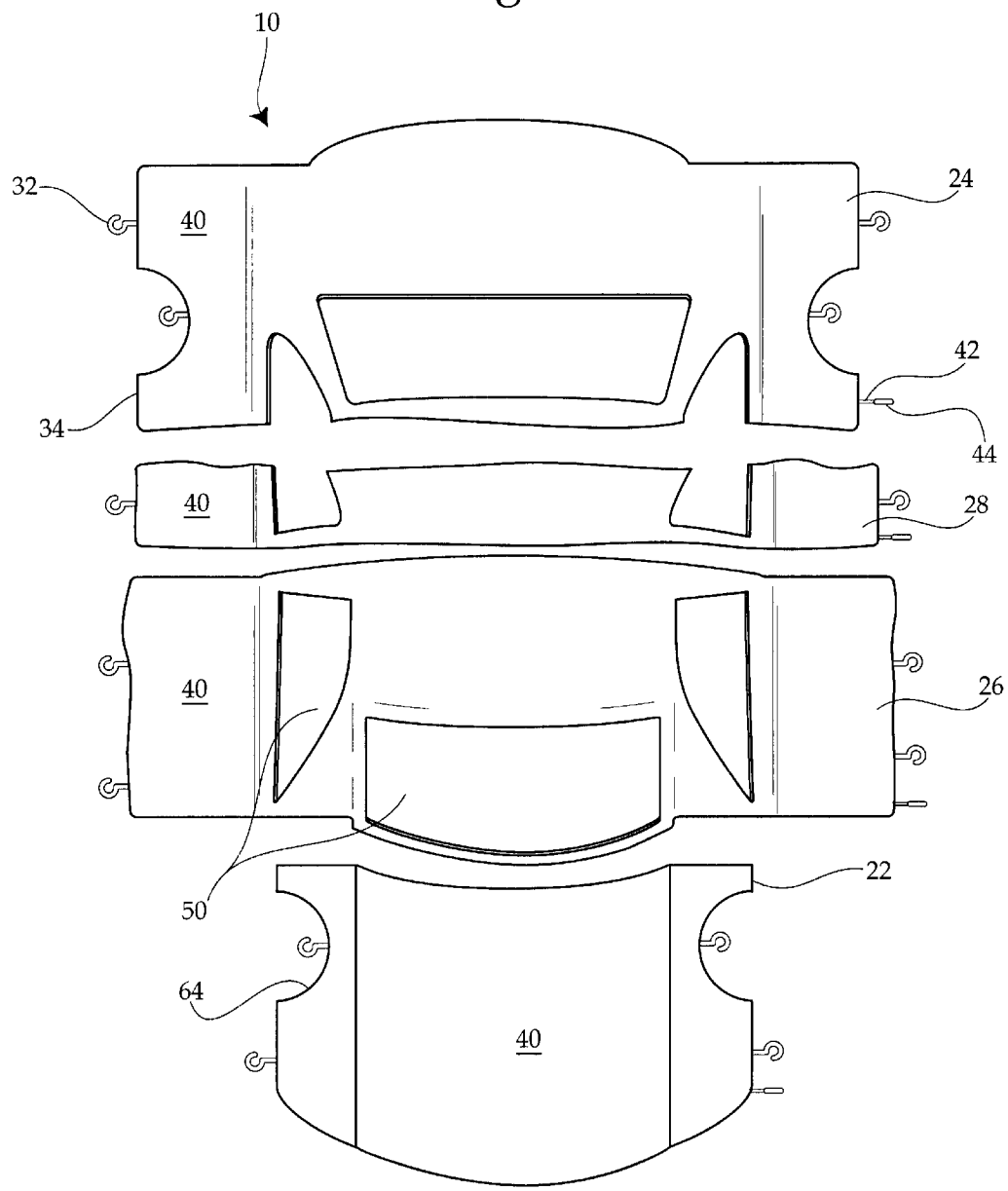
FIG. 4 is a top elevational view of the automobile body covers.

REFERENCE NUMERALS 10 automobile body cover
12 automobile
12B automobile body
14 automobile front end
16 automobile rear end
18 automobile front middle section
20 automobile rear middle section
22 front cover
24 rear cover
26 front middle cover
28 rear middle cover
30 open bottom end of covers
32 C-shaped hooks
34 bottom edge of covers
36 magnets
38 inner layer of covers
40 outer layers of covers
42 valve stem
44 valve stem cap
46 cover screens
48 automobile headlights
50 cover window cutouts
52 automobile windows
54 automobile windshield
56 automobile rear passenger windows
58 automobile brake lights
60 automobile rear windshield
62 automobile wheel wells
64 wheel well cutouts
66 automobile doors

DETAILED DESCRIPTION OF THE PREFERRED EMBODIMENTS

FIG. 1 illustrates an automobile body cover 10 positioned over an automobile 12. The automobile body cover 10 is designed to fit snugly around an automobile body 12B in order to protect the automobile 12 from damage caused by weather elements and collisions with other automobiles. The automobile 12 has a front end 14, a rear end 16, a front middle section 18, and a rear middle section 20. The front end 14 of the automobile 12 has headlights 48 and wheel wells 62. The front middle section 18 has windows 52 on either side, and a windshield 54 extending horizontally across the section 18. The rear middle section 20 also has a set of windows 52. Finally, the rear end 16 of the automobile 12 has brake lights 58, a rear windshield 60, and a set of wheel wells 62.

The automobile body cover 10 comprises a plurality of individual covers that when fitted about the automobile body 12B completely covers same. In particular, the automobile body cover 10 is broken into a front cover 22, a rear cover 24, a front middle cover 26, and a rear middle cover 28. Each cover fits over the corresponding part of the automobile 12, namely the front cover 22 fits around the front end 14 of the automobile 12, the rear cover 24 fits around the rear end 16, the front middle cover 26 fits around the front middle section 18, and the rear middle cover 28 fits around the rear middle section 20.

Each cover 22, 24, 26, 28 is essentially a shell, having an inner layer 38 and an outer layer 40, an open bottom end 30 and a bottom edge 34. The layers 38 and 40 are bound together at the bottom edge 34. When in place over the automobile 12, the inner layer 38 rests against the automobile body 12B. Thus, it is preferable that this inner layer 38 be constructed from a soft, non-abrasive fabric, namely sheepskin, to avoid damage to said automobile body 12B. Alternatively, the outer layer 40 is preferably constructed from a durable, waterproof material, such as vinyl, since this layer 40 is exposed to various elements, namely weather.

A plurality of C-shaped hooks 32 extend downward from the bottom edges 34 of the covers 22, 24, 26, 28. These hooks 32 secure the covers 22, 24, 26, 28 in place under the automobile 12. Also positioned along the cover bottom edges 34, between the inner layer 38 and the outer layer 40, are a plurality of magnets 36. When in place over the automobile 12, the magnets 36 adhere to the automobile body 12B and prevent the covers 22, 24, 26, 28 from moving.

Also positioned at the bottom edge 34 of each cover 22, 24, 26, 28 is a valve stem 42. The valve stem 42 has a cap 44 that may be removed from the stem 42. When the cap 44 is removed, the stem 42 may be connected to a vacuum source, such as a compressor in order to draw out air from between the inner and outer layers 38, 40 of the covers 22, 24, 26, 28. This will pull the covers 22, 24, 26, 28 flush against the automobile body 12B.

Each cover 22, 24, 26, 28 is specifically designed to fit the corresponding automobile section. The front cover 22 has wheel well cutouts 64 and screens 46 strategically positioned so as to cover the headlights 48 on the front end 14 of the automobile 12. The front middle cover 26, draped over the front middle section 18 of the automobile 12, has three cutouts 50, two over the automobile windows 52 and one over the automobile windshield 54. These cutouts 50 allow a person in the automobile 12 to utilize the windows 52 without interference from the cover 26. The rear middle cover 28 also has cutouts 50 for the rear passenger windows 56. Finally, the rear cover 24, positioned over the automobile rear end 16, has screens 46 similar to those on the front cover 22, for placement over the brake lights 58. The rear cover 24 also has a cutout 50 for the rear windshield 60 and wheel well cutouts 64.

In use, the appropriate cover 22, 24, 26, 28 is selected and positioned over the corresponding automobile section. When properly in place, the bottom edge 34 of the cover 22, 24, 26, 28 is aligned with the bottom edge of the automobile body 12B, with the cover 22 being slightly longer than the automobile 12 to allow said cover 22 to wrap under the automobile 12. The C-shaped hooks 32 are then extended under the automobile body 12B and hooked to an appropriate part of the automobile 12. The magnets 36 are thus secured to the 42 and air trapped between the inner and outer layers 38, 40 of the covers 22, 24, 26, 28 is drawn out. After each cover 22, 24, 26, 28 is properly placed over the automobile 12, all cutouts 50 and screens 46 should be lined up with the proper automobile part. The unique shaping of each cover, namely the middle covers 26, 28 allow the automobile doors 66 to be opened and closed without any interference.

In conclusion, herein is presented an automobile body cover. The invention is illustrated by example in the drawing figures, and throughout the written description. It should be understood that numerous variations are possible, while adhering to the inventive concept. Such variations are contemplated as being a part of the present invention.

What is claimed is:

1. An automobile body cover for use with an automobile, the automobile having a front end, a front middle section, a rear middle end, and a rear end, the front end having a pair of wheel wells and front headlights, the front middle section having a pair of side windows and a front windshield, the rear middle end having a pair of side windows, and the rear end having a pair of wheel wells, a rear windshield, and rear brake lights comprising:

a plurality of covers for placement over the automobile, including a front cover for placement over the automobile front end, a front middle cover for placement over the automobile front middle section, a rear middle cover for placement over the automobile rear middle section, and a rear cover for placement over the rear end, the covers each having an open bottom end, a bottom edge, an inner layer, and an outer layer, the inner layer positioned against the automobile body when the covers are in place over the automobile, the layers are bound together at the bottom edge of the covers, each cover further having a plurality of magnets, a valve stem, and a valve stem cover, the magnets positioned along the bottom edge of each cover, between the inner layer and the outer layer, said magnets securing the covers in place against the automobile body, and the valve stem allowing air trapped between the inner and outer layers of the covers to be evacuated from the covers;

wherein the front cover and the rear cover each have a plurality of screens strategically positioned on said covers so as to be aligned with the front headlights and the rear brake lights of the automobile respectively when the covers are in place over said automobile, and the covers further have wheel well cutouts to accommodate the automobile wheel wells;

wherein the front middle cover, the rear middle cover, and the rear cover each have cutouts strategically positioned on said covers so as to be aligned with the front windshield, the side windows, and the rear windshield of the automobile when the covers are in place over said automobile; and a plurality of C-shaped hooks positioned along the bottom edge of each cover for securing the covers to the automobile body.

\* \* \* \* \*